3,836,526
NOVEL 1,2-METHYLENE - 9β,10α-STEROID COMPOUNDS, PHARMACEUTICAL PREPARATIONS WHICH CONTAIN THE NOVEL SUBSTANCES AS ACTIVE INGREDIENTS, AND METHODS OF PRODUCING THE SAID COMPOUNDS AND PREPARATIONS
Harmen van Kamp, Pieter Westerhof, and Lucas Morsink, Weesp, Netherlands, assignors to U.S. Philips Corporation, New York, N.Y.
No Drawing. Filed Feb. 26, 1971, Ser. No. 119,401
Claims priority, application Netherlands, Mar. 4, 1970, 7003063
Int. Cl. C07c *169/32, 173/00*
U.S. Cl. 260—239.55 R
5 Claims

ABSTRACT OF THE DISCLOSURE

The invention relates to a novel 1,2-methylene-17α-alkoxy-9β,10α-steroids, of the pregnane series which have a greatly-prolonged-action progestational activity. After the compounds have been worked up into pharmaceutical preparations they may be used as contraceptives and to counteract or prevent dysmenorrhea, endometriosis and habitual or imminent abortion. A highly active substance is, for example, 1,2-methylene-17α-methoxy-9β,10α-pregna-4,6-diene-3,20-dione.

---

The U.S. Pat. No. 3,198,792 describes that the steroids of the retro-series, which in contrast the steroids of the normal series have a 9β,10α configuration, exhibit interesting endocrinological properties. As examples of retro-steroids columns 11-23 of the said patent give about 800 substances of groups of substances.

It has now been found that novel 9β,10α steroids which correspond to the general formula

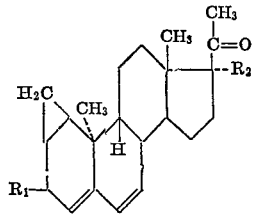

where $R_1$ is a double-bonded oxygen atom or an etherified or esterified hydroxy group and $R_2$ is an etherified hydroxy group containing from 1–5 carbon atoms, have a greatly-prolonged-action progestational activity. This applies especially to the compounds of the above formula in which $R_1$ is an oxygen atom and $R_2$ is an alkoxy group containing from 1–3 carbon atoms.

Examples of highly active compounds are:

1,2-methylene-17α-methoxy-9β,10α-pregna-4,6 - diene - 3, 20-dione, 1,2-methylene-17α-ethoxy-9β,10α-pregna-4,6-diene - 3,20-dione, and 1,2-methylene-17α-tetrahydropyranyloxy-9β,10α - pregna-4,6-diene-3,20-dione.

In this connection it should be mentioned that tests have shown that the compounds 1,2-methylene-17α-methoxy-9β,10α-pregna-4,6-diene-3,20 dione and 1,2-methylene-17α-tetrahydropyranyloxy-9β,19α-pregna - 4,6-diene-3,20-dione when administered parenterally have a prolonged progestational activity which is higher by a factor of from 10 to 20 than that of the commercial product "Duphaston long acting."

When the substituent $R_1$ represents an esterified hydroxy group, this group contains from 1–20 carbon atoms and has preferably been derived from a saturated or unsaturated aliphatic monocarboxylic or tricarboxylic acid, an alicyclic carboxylic acid, a mixed aliphatic-alicyclic carboxylic acid, an aliphatic-aromatic carboxylic aid or from an aromatic carboxylic acid. Examples of esterified hydroxy groups are hydroxy groups esterified with formic acid, acetic acid, propionic acid, butyric acid, decane carboxylic acid, cyclohexylpropionic acid, phenylpropionic acid, phenylacetic acid, phenyloxyphenyl propionic acid, enanthoylacetic acid, oleic acid, palmitic acid, stearic acid, enanthoic acid, caproic acid, pivalic acid, succinic acid, maloic acid, benzoic acid, citric acid, p-hexyloxyphenylpropionic acid, hexahydrobenzoic acid, β-cyclopentylpropionic acid and β-cyclohexylpropionic acid.

When $R_1$ represents an etherified hydroxy group, this group is preferably derived from an aliphatic, mixed aliphatic aromatic or mixed aliphatic-alicyclic alcohol. Examples of etherified hydroxy groups are: methoxy, ethoxy, t-butoxy, cyclohexyloxy, benzyloxy, tetrahydrofuranyloxy and tetrahydropyranyloxy.

It should further be pointed out that the 1,2-methylene group present in the compound according to the invention is in the β-position.

The compounds according to the invention are novel substances which may be prepared by methods which as such are known for producing similar compounds or by analogous methods. For example, compounds according to the invention may be produced by:

(a) reacting a compound of the formula

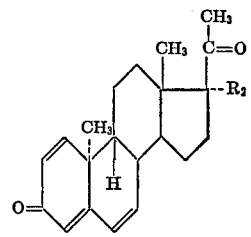

where $R_2$ has the aforementioned meaning, with dimethylsulfoxoniummethylide in an aprotic solvent, the corresponding 1,2-methylene compound being obtained;

(b) treating a compound of the formula

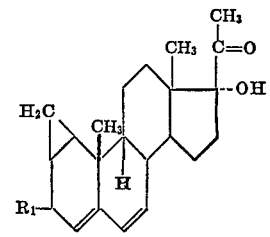

where $R_1$ has the aforementioned meaning, with an etherifying agent, a compound of the formula

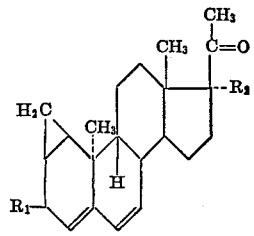

where $R_1$ and $R_2$ have the aforementioned meanings, being obtained, or (c) treating a compound of the formula

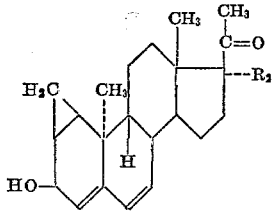

where $R_2$ has the aforementioned meaning, with an alkylating or acylating agent, a compound of the formula

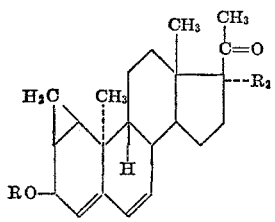

where $R_2$ has the aforementioned meaning and OR represents an etherified or esterified hydroxy group, being obtained.

The above methods (a) to (c) will be described in more detail hereinafter. When the literature is referred to, this means that the respective process is analogous to the process described in the literature.

Concerning (a): Suitable aprotic solvents are, for example, ethers, such as dioxan or tetrahydrofuran, and dimethylsulfoxide. The reaction temperature may vary between 0 and 80° C. and preferably is from 15 to 30° C. The reagent is produced by treating trimethylsulfoxoniumiodide with a base, such as an alkali hydroxide, in the presence of a solvent, such as dimethylsulfoxide.

Concerning (b): Etherification takes place by reacting the starting material with an alkylating agent. A suitable alkylating agent is an alkylhalide, such as methyliodide, methylbromide, ethyliodide or propyliodide. The reaction is carried out in the presence of newly precipitated sulfuroxide in an inert polar solvent, such as formamide, dimethylformamide or dimethylsulfoxide. Etherification may alternatively be effected by treating the starting material with dihydropyran or dihydrofuran in a weak acid, such as an alkaline or neutral medium.

The starting materials for the method (b) may be obtained by reacting a compound of the formula

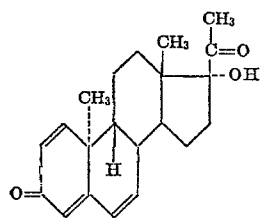

with dimethylsulfoxoniummethylide in an aprotic solvent (cf. method (a)).

The resulting compound, which corresponds to the formula

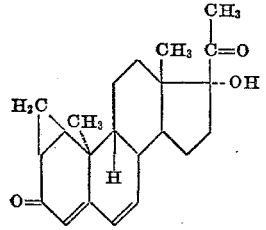

may then be subjected to selective reduction of the 3-keto-oxygen atom to a 3-hydroxy group, which is etherified or esterified.

Suitable reducing agents are $NaBH_4$ in methanol or tetrahydrofuran at low temperature and $LiAlH[t.OBu]_3$.

The etherification of the resulting 3-hydroxy-group may be effected with an alcohol in the presence of a catalytic amount of an acid, such as HCl. The etherification takes place by treatment with a carboxylic acid chloride or anhydride in the presence of a base, such as pyridine or collidine.

The aforementioned reaction with dimethyl-sulfoxoniummethylide will be improved (increased yield) if the 17-OH group present in the starting material is converted into an ether group. Conversion takes place by reaction with dihydropyran or dihydrofuran in a weakly acetic, weakly alkaline or neutral medium, the 17-OH group being replaced by a 17-tetrahydropyranyloxy or 17-tetrahydrofuranyloxy group. Rapid conversion with a high yield is obtainable, for example, by carrying out the reaction with dihydropyran or dihydrofuran in the presence of p-tosylalcohol as a catalyst. In this process the solvent used preferably is benzene. Under these conditions the reaction time is about 1 hour at room temperature.

After the main reaction with the dimethylsulfoxoniummethylide reagent the 17-ether group may be reconverted into the 17-OH group by means of mild hydrolysis.

Concerning (c): As has been mentioned hereinbefore in the commentary on (b), the alkylation reaction is effected with an alcohol in the presence of a catalytic amount of an acid. The acylating reaction is effected with a carboxylic acid chloride or anhydride in the presence of a base.

The starting material for the method (c) is obtainable by reducing the corresponding 3-keto compound with $NaBH_4$ in menthanol or tetrahydrofuran or with $$LiAlH[t.OBu]_3$$

Because of their endocrinological activity the substances according to the invention are suitable for the following uses: as contraceptives, to counteract or prevent habitual or imminent abortion, to counteract sterility, in dysmenorrhea, menorrhagia, oligo- and polymenorrhea, primary and secondary amenorrhea, hyper- and hypomenorrhea, endometrial carcinomata, endometriosis and prostatic hypertrophy.

For practical uses the compounds of the invention are worked up into preparations or pharamaceutical solid dosage forms suitable for oral and parenteral administration.

Examples of preparations or solid dosage forms according to the invention are injection liquids, powders, capsules, implantation capsules, tablets, dragées, pills and pessaries. In all these forms of preparation the active compound according to the invention is mixed with a solid or liquid inert carrier material, if desired in the presence of adjuvants, such as surface-active substances, lubricants, binders, disintegrating agents and solvents.

The preparations according to the invention may contain in addition to the active substance according to the invention another, known endocrinologically active compound. Thus, a preparation according to the invention may also contain an estrogenic substance, such as ethinylestradiol or mestranol. Such combination preparations according to the invention are used especially for antifertile uses and for the treatment of endometriosis and dysmenorrhea.

The amount of active substance in a preparation according to the invention may vary within wide limits in accordance with the form of the preparation and the field of use. In general, in order to achieve a satisfactory effect a dosage unit of the preparation according to the invention will contain at least several milligrams of the active substance.

The preparations according to the invention may be prepared by mixing the active substance with a solid carrier material or by dissolving or dispersing it in a liquid carrier material, if required with the addition of adjuvants, such as lubricants, binders, disintegrating agents, surface-active substances and solvents.

The combination preparations according to the invention are obtained by adding at least one known endocrinologically active substance, such as an estrogenic substance, to the ingredients to be mixed, dissolved or dispersed.

Examples of suitable solid carrier materials for oral preparations, such as tablets and dragées, are disaccharides and polysaccharides, such as saccharose, lactose, glucose and dextrose, cellulose and cellulose derivatives, such as carboxymethylcellulose, methylcellulose, ethylcellulose, hydroxyethylcellulose and hydroxypropylcellulose, alginic acid, salts of alginic acids and hemicelluloses, such as galactomannan. Suitable liquid carrier materials for injection preparations are, for example, arachis oil, sesame oil, soya oil, olive oil and the mixtures of these or similar vegetable oils, and further isopropylmyristate and ethyloleate. Examples of suitable binders are: gelatin, pectin, amylose, agar-agar, tragacanth, polyethylene glycols, gum arabic and polyvinylpyrrolidone. Suitable disintegrating agents are, for example, aminopectins, starches, such as maize starch, potato starch and rice starch, formalincasein, bentonite, silicondioxide and ion exchangers. Examples of suitable lubricants are: polyethylene glycols, stearic acid, salts of stearic acid, such as magnesium stearate and aluminium stearate.

Surface-active substances which may be used are, for example, wetting agents, such as sodiumdioctylsulfosuccinate, sodiumlaurylsulfate, polyoxyethylenesorbitanmonolaurate, polyoxyethylenealkylethers and sulfated cetyloleyl alcohol. Suitable solvents, for example in producing injection preparations, are methylene chloride and benzyl alcohol.

Tablets and dragées according to the invention are obtainable, for example, by mixing the desired amount of the active substance with a solid carrier material, for example one of the aforementioned carrier materials, together with adjuvants such, for example, as a starch, magnesium stearate and talc. The resulting mixture is homogenized and worked up into tablets of dragées. The tablets or dragées may, if desired, be provided with a sugar coating which may consist of the following ingredients: talc, gelatin, gum arabic, potato starch, saccharose and a dye. Instead of a sugar coating another film-forming agent may be used such, for example, as ethylcellulose and polyacrylates. Injection liquids may be obtained by dissolving the active substance in methylene chloride, taking up the solution in arachis oil and evaporating the solvent. Ampules and bottles may be filled with the resulting solution, sealed and finally sterilized by heating them at 120° C. for some time.

The invention will now be illustrated by the following Examples.

EXAMPLE 1

Production of 17α-methoxy-1,2-methylene-9β,10α-pregna-4,6-diene-3,20-dione 1.78 gram of 17α-hydroxy 1,2-methylene-9β,10α-pregna-4,6-diene-3,20-dione is dissolved in 35 ml. of dry dimethylformamide with stirring. 17.5 ml. of methyliodide and 3.56 g. of newly prepared silver oxide are added to the solution. The mixture is stirred at room temperature for 70 hours. The solid material is removed by filtering, the filtrate is poured in water and extracted 4 times with 150 ml. of methylene chloride. The organic layer is washed with water, dried, filtered and evaporated to dryness. The resulting residue is chromatographed over 50 g. of silicagel and eluted with mixtures of methylene chloride and acetone. The resulting residue is crystallized from methylene chloride ether and after drawing off yields 17α - methoxy - 1,2 - methylene-9β,10α-pregna-4,6-diene-3,20-dione having a melting point of 228–229.5° C.

EXAMPLE 2

Production of 17α-ethoxy-1,2-methylene-9β,10α-pregna-4,6-diene-3,20-dione

In a manner similar to that described in Example 1, 0.5 gram of 17α-hydroxy-1,2-methylene-9β,10α-pregna-4,6-diene-3,20-dione is dissolved in 10 ml. of dimethylformamide and reacted with 6.5 ml. of ethyl iodide and 1 g. of silver oxide. The resulting 17α-ethoxy-1,2-methylene-9β,10α-pregna-4,6-diene-3,20-dione has a melting point of 214–216° C.

EXAMPLE 3

Production of 1,2-methylene-17α-hydroxy-9β,10α-pregna-4,6-diene-3,20-dione 17-tetrahydropyranylether 200 mg. of paratoluenesulfonic acid in 50 ml. of absolute benzene is added to a stirred solution of 10 g. of 1,2-methylene - 17α - hydroxy-9β,10α-pregna-4,6-diene-3,20-dione in 50 ml. of methylene chloride whilst nitrogen is passed through. 5 ml. of dihydropyran in the form of 3 portions of 1.66 ml. each is added to the solution with time intervals of 10 minutes. After stirring at room temperature for 3 hours another portion of 2 ml. of dihydropyran is added. After a total reaction time of 5.5 hours the reaction mixture is poured in water. The layers are separated, the water layer is abstracted with methylene chloride and the organic layer is successively washed with water, a 5% sodium bicarbonate solution and water. After drying and evaporation of the solvent the residue is crystallized from acetone. The melting point of the obtained 1,2 - methylene-17α-hydroxy-9β,10α-pregna-4,6-diene-3,20-dione 17-tetrahydropyranylether is 210° C.

What is claimed is:
1. Compounds of the general formula

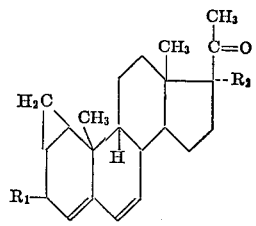

where $R_1$ is a double-bonded oxygen atom or an etherified or an esterified hydroxy group an $R_2$ is an etherified hydroxy group containing from 1–5 carbon atoms.

2. Compounds of the general formula

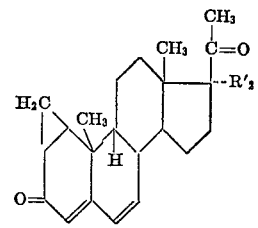

where $R'_2$ is an alkoxy group containing from 1–3 carbon atoms.

3. 1,2-methylene-17α-methoxy-9β,10α-pregna-4,6-diene-3,20-dione.

4. 1,2 - methylene-17α-ethoxy-9β,10α-pregna-4,6-diene-3,20-dione.

5. 1,2 - methylene-17α-tetrahydropyranyloxy-9β,10α-pregna-4,6-diene-3,20-dione.

References Cited

UNITED STATES PATENTS

| 3,549,671 | 12/1970 | Laurent et al. | 260—397.4 |
| 3,510,556 | 5/1970 | Erb et al. | 424—240 |
| 3,557,160 | 1/1971 | Beard et al. | 260—397.4 |

ELBERT L. ROBERTS, Primary Examiner

U.S. Cl. X.R.

260—397.4; 424—243